(12) United States Patent
Jupina

(10) Patent No.: US 6,558,786 B1
(45) Date of Patent: May 6, 2003

(54) CONTINUOUS FOAM RUG GRIPPER AND METHOD OF USING THE SAME

(75) Inventor: Michael S. Jupina, Olmsted Township, OH (US)

(73) Assignee: Henkel Consumer Adhesives, Inc., Avon, OH (US)

( * ) Notice: Subject to any disclaimer, the term of this patent is extended or adjusted under 35 U.S.C. 154(b) by 97 days.

(21) Appl. No.: 09/625,205

(22) Filed: Jul. 24, 2000

(51) Int. Cl.[7] .............................. B32B 3/00; B32B 3/26; B32B 7/12

(52) U.S. Cl. ............................... 428/316.6; 428/317.1; 428/317.3; 428/317.7; 16/8; 16/16; 16/17.1; 442/151; 442/221; 442/223; 442/370

(58) Field of Search .................... 428/316.6, 317.1, 428/317.3, 317.7; 16/8, 16, 17.1; 442/151, 221, 223, 370

(56) References Cited

U.S. PATENT DOCUMENTS

| | | |
|---|---|---|
| 1,499,166 A | 6/1924 | Frazier |
| 1,872,846 A * | 8/1932 | Thiele ..................... 442/221 |
| 1,985,203 A * | 12/1934 | Charbonneau ............. 442/101 |
| 2,218,444 A | 10/1940 | Vineyard |
| 2,759,866 A | 8/1956 | Seymour |
| 2,956,917 A | 10/1960 | Fasano |
| 3,160,548 A | 12/1964 | Gillick, Jr. et al. |
| 3,454,168 A | 7/1969 | Cahn |
| 3,496,043 A | 2/1970 | Ragan |
| 3,506,533 A | 4/1970 | Berner |
| 3,861,326 A | 1/1975 | Brown |
| 4,116,743 A | 9/1978 | Davis |
| 4,189,125 A | 2/1980 | Little |
| 4,234,649 A | 11/1980 | Ward |
| 4,296,162 A | 10/1981 | Jean |
| 4,305,985 A | 12/1981 | Heublein |
| 4,307,145 A | 12/1981 | Goldman |
| 4,314,648 A | 2/1982 | Spamer |
| 4,316,926 A | 2/1982 | Kaminstein |
| 4,416,380 A | 11/1983 | Flum |
| 4,454,949 A | 6/1984 | Flum |
| 4,460,643 A | 7/1984 | Stevens et al. |
| 4,461,388 A | 7/1984 | Bustos |
| 4,470,943 A | 9/1984 | Preis |
| 4,488,918 A | 12/1984 | Jofs |
| 4,496,037 A | 1/1985 | Spamer |
| 4,510,201 A * | 4/1985 | Takeuchi et al. ............ 428/385 |
| 4,515,852 A | 5/1985 | Katabe et al. |
| 4,519,508 A | 5/1985 | Gullett et al. |
| 4,524,097 A | 6/1985 | Graham |
| 4,565,725 A | 1/1986 | Spamer et al. |
| 4,598,828 A | 7/1986 | Young et al. |
| 4,603,074 A | 7/1986 | Pate et al. |
| 4,651,883 A | 3/1987 | Gullett et al. |
| 4,668,547 A | 5/1987 | Brouessard |
| 4,716,069 A | 12/1987 | Burke |
| 4,809,855 A | 3/1989 | Bustos |
| 4,816,316 A | 3/1989 | Robbins, III |
| 4,816,319 A | 3/1989 | Dees, Jr. et al. |
| 4,843,975 A | 7/1989 | Welsch et al. |
| 4,947,999 A | 8/1990 | Warp |

(List continued on next page.)

FOREIGN PATENT DOCUMENTS

| | | | |
|---|---|---|---|
| DE | 7124118.4 | * | 6/1971 |
| FR | 1440797 | * | 4/1966 |
| WO | PCT/US96/17206 | | 4/1997 |
| WO | WO 97/24226 | | 7/1997 |

*Primary Examiner*—Terrel Morris
*Assistant Examiner*—Leanna Roché
(74) *Attorney, Agent, or Firm*—Fay, Sharpe, Fagan, Minnich & McKee

(57) ABSTRACT

A rug gripper for preventing the lateral movement of a rug on a floor comprising a continuous non-slip, non-adhesive foam layer having a top surface and a bottom surface. The top surface of the foam layer includes an adhesive layer for adhering the foam layer to the rug and the bottom surface of the foam layer engages the floor.

3 Claims, 3 Drawing Sheets

U.S. PATENT DOCUMENTS

| | | | |
|---|---|---|---|
| 4,985,279 A | * | 1/1991 | Mussallem, III ............ 156/148 |
| 5,084,317 A | * | 1/1992 | Epple ........................ 428/41.4 |
| 5,120,587 A | * | 6/1992 | McDermott et al. ..... 427/208.4 |
| 5,160,770 A | * | 11/1992 | Hoopengardner .......... 428/41.5 |
| 5,316,840 A | | 5/1994 | Kubo et al. |
| 5,318,835 A | * | 6/1994 | Sawamoto et al. ...... 428/317.3 |
| 5,346,278 A | | 9/1994 | Dehondt |
| 5,364,681 A | | 11/1994 | Pate et al. |
| 5,425,521 A | | 6/1995 | Locke |
| 5,518,799 A | | 5/1996 | Finestone et al. |
| 5,614,288 A | | 3/1997 | Bustos |
| 5,632,844 A | | 5/1997 | Pate et al. |
| 5,707,903 A | | 1/1998 | Schottenfeld |
| 5,845,144 A | | 12/1998 | Hawley |
| 5,863,845 A | | 1/1999 | Owen |
| 5,874,371 A | | 2/1999 | Owen |
| 5,993,936 A | | 11/1999 | Gardner |
| 6,013,342 A | * | 1/2000 | Neto .......................... 428/137 |
| 6,022,617 A | | 2/2000 | Calkins |
| 6,143,118 A | * | 11/2000 | Hornaman et al. ......... 156/238 |
| 6,189,279 B1 | * | 2/2001 | Fiechtl ..................... 52/403.1 |

* cited by examiner

CONTINUOUS FOAM RUG GRIPPER AND METHOD OF USING THE SAME

FIELD OF THE INVENTION

This invention relates to sheet material usable by a consumer to prevent lateral movement of an area rug on a floor surface and more particularly, to a foam sheet material having uniform characteristics with an adhesive coated top surface and a non-adhesive bottom surface.

BACKGROUND OF THE INVENTION

Consumers often use area rugs over a wide variety of flooring, both for decoration and to prevent wear in high traffic areas. These rugs can add color to a room and can prevent premature wear of a floor's finish. However, area rugs have a tendency to move laterally when placed on hard, smooth flooring. This results in the area rug moving from its desired location and/or the formation of wrinkles in the area rug.

Various products have been used to reduce the amount of lateral movement and wrinkling that are traditionally associated with area rugs. These include the use of double-faced adhesive tape, wherein one surface adheres to the underside of the rug and the other adheres to the floor surface. While double-faced adhesive tape can reduce the amount of lateral movement and wrinkling, it has many inherent disadvantages. One such disadvantage is the inability to adjust the rug once it has been positioned. This makes installation more difficult by not permitting adjustment, and makes cleaning the floor surface, redecoration, or rearrangement laborious. In addition, the adhesive associated with double-faced tape tends to break down over time, causing residue to remain on the floor surface after removal of the rug. This breakdown also affects the bond between the tape and the floor surface, thereby reducing the expected life span of the product.

Another product that has been used to prevent lateral movement of an area rug is made from a loosely-woven fabric scrim that has been coated with a foamed polyvinyl chloride. This product is non-continuous in that there are openings between many of the adjacent scrim fibers even after the application of the foam. The foam has a non-slip characteristic to reduce the lateral movement even though it is not an adhesive. Such foam-covered scrim sheet material is commercially available in various sizes. While the foam scrim overcomes many of the problems associated with use of double-sided tape, it also has many disadvantages. Firstly, while the polyvinyl chloride foam has good non-slip characteristics in relation to smooth surfaces, its non-slip characteristics are limited in relation to the underside surface of a rug. Therefore, while the coated scrim may remain in position in relation to the flooring, the area rug has a tendency to move laterally in relation to the foam scrim and the floor. Secondly, the voids present between the adjacent scrim fibers can trap unwanted moisture or debris thereby increasing the likelihood of damage to the floor surface that the rug is meant to protect. Thirdly, polyvinyl chloride coated foam scrims used in the past can contain plasticizers which can leech out over time, thereby causing discoloration of floor surface upon which the polyvinyl chloride foam is placed.

In an attempt to overcome the shortcomings of the polyvinyl chloride coated scrim, adhesives have been utilized in connection with loosely-woven scrims instead of the polyvinyl chloride foam as described in U.S. Pat. No. 4,234,649 which is incorporated herein by reference. This enables the scrim to better adhere to the bottom surface of the area rug in an attempt to reduce lateral movement of the rug in relation to the scrim. However, since the use of adhesives is known to leave a residue on the floor surface after removal, one side of the scrim has a light coating of adhesive while the other side of the scrim has a heavier coating of adhesive. The heavily coated side is designed to adhere to the underside surface of the area rug, while the lightly coated side is designed to adhere to the floor surface. While the use of adhesive improves the performance of the product, the manner in which it is used has inherent problems. Both the lightly coated and heavily coated surfaces of the scrim are virtually identical visually. Therefore, the end user of this product can easily apply the wrong surface of the scrim to the underside of the area rug. The result is poor performance. As with the polyvinyl chloride coated scrim, the lightly coated surface of the adhesive scrim, which is intended to adhere to the floor surface, fails to adequately adhere to the underside surface of the area rug. In addition, use of the heavily coated side of the scrim on the floor surface increases the difficulty in removing the rug gripper from the floor, and also increases the amount of residual adhesive that will remain on the floor after the product is removed. Even if the product is properly oriented in relation to the area rug and the floor surface, residual adhesive on the floor surface after removal is still often associated with this product. This inherent problem increases as the duration of use of the product increases. Furthermore, the problem associated with the loosely-woven scrim trapping unwanted moisture and debris is not overcome by this product. Another disadvantage is that exposure to moisture can drastically reduce the performance of the adhesive. As a result, the adhesive-coated scrim does not perform well in all conditions and can even mar the finish of the floor surface which it is supposed to protect.

SUMMARY OF THE INVENTION

In accordance with the present invention, an improved rug gripper is provided which advantageously prevents lateral movement of an area rug in relation to a floor surface in a manner which promotes ease of use and the ability to reposition the rug without reducing the rug gripper's ability to prevent lateral movement or leave unwanted residue. Furthermore, the rug gripper is of a continuous design thereby reducing voids which can trap unwanted moisture or debris. Moreover, the rug gripper is equally effective on a wide range of floor surfaces and is not significantly affected by wet floor surfaces.

The foregoing advantages are achieved in accordance with the present invention by utilizing a continuous non-slip foam to engage the floor surface. The opposite surface of the rug gripper is coated with an adhesive to facilitate the connection with the underside surface of the area rug. As a result, the rug gripper remains rigidly interengaged with the underside surface of the rug and the non-slip continuous foam is the only portion of the product that engages the floor surface to prevent lateral movement of the rug. Accordingly, when the rug is removed or repositioned, residual adhesive is not left behind on the floor surface, and the rug gripper will work in the new position or location without reapplication.

It is accordingly an outstanding objective of the present invention to provide a rug gripper for preventing lateral movement of an area rug when placed on a floor surface.

It is another object of the present invention to provide a rug gripper with an upper surface which will securely adhere to the underside surface of an area rug.

It is still another object of the present invention to provide a rug gripper which has a non-adhesive bottom surface which directly contacts the floor surface.

It is yet another object of the present invention to provide a rug gripper which minimizes residual matter left behind after removal thereof from the floor surface.

It is still another object of the present invention to provide a rug gripper which has no voids to adversely produce spaces or pockets for trapping moisture and debris.

It is yet another object of the present invention to provide a rug gripper which is inexpensive to manufacture while providing superior properties.

It is another object of the present invention to provide a rug gripper that is easy to use by the end-user.

BRIEF DESCRIPTION OF THE DRAWINGS

The foregoing objects, and others, will in part be obvious and in part pointed out more fully hereinafter in connection with the written description of the preferred embodiment of the invention illustrated in the accompanying drawings in which.

DESCRIPTION OF THE PREFERRED EMBODIMENT

Figure 1:
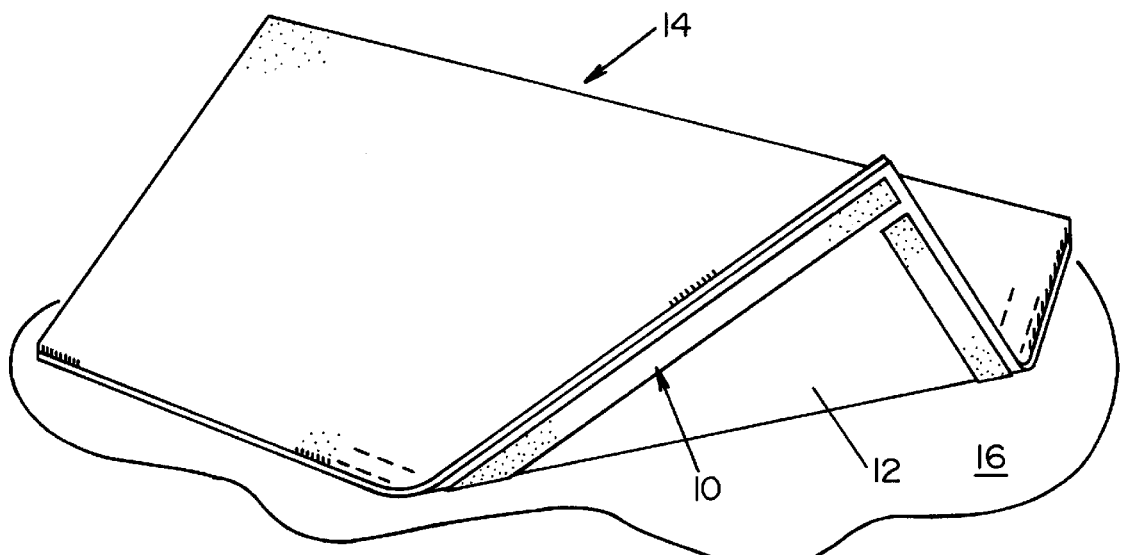
FIG. 1 is a perspective view of an area rug wherein one corner thereof has been raised to show the rug gripper in accordance with the invention.

Referring now in greater detail to the drawings, wherein the showings are for the purpose of illustrating the preferred embodiment of the invention only, and not for the purpose of limiting the same; referring to FIG. 1, a rug gripper 10 is applied to the underside surface 12 of an area rug 14. Typically, the rug gripper 10 is installed onto the perimeter of underside, surface 12 of rug 14. This prevents lateral movement, reduces wrinkling, and maintains the edges of rug 14 on floor surface 16. However, it should be noted that rug gripper 10 can also be used inwardly from the edges of area rug 14 to further prevent lateral movement or wrinkling of rug 14.

Figure 2:
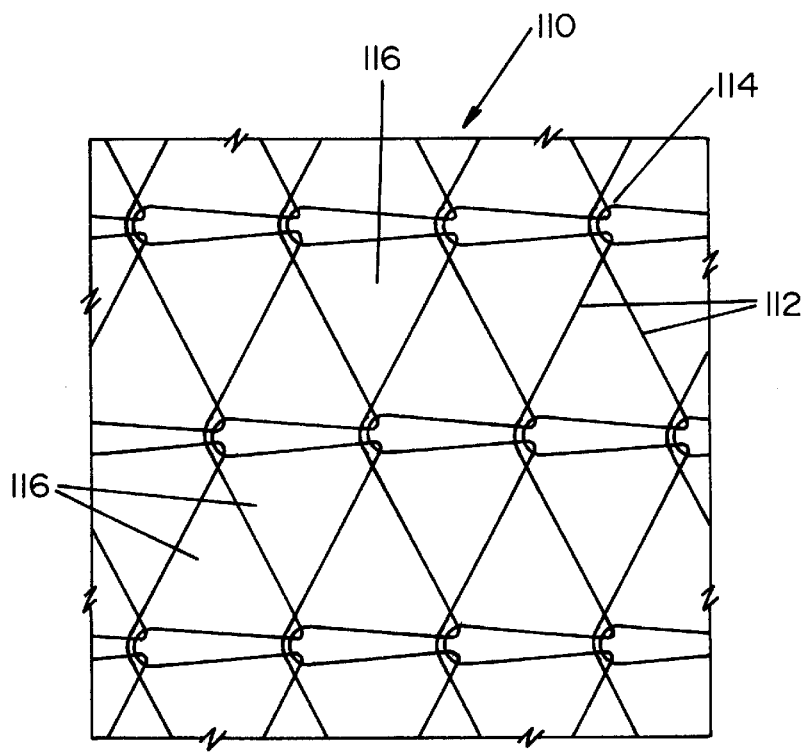
FIG. 2 is a top plan view of the prior art.

Referring to FIG. 2, a section of a scrim-based rug gripper 110 is shown that represents a commercially available product. This product is comprised of a loosely-woven scrim 112 that includes a complex weave pattern 114. Furthermore, the loosely-woven structure creates a repeated pattern of large voids 116, resulting in a number of previously discussed disadvantages. The loosely-woven pattern reduces the contact surface between the rug gripper 110 and the bottom surface 12 of the area rug 14. This requires the use of additional adhesive to adhere the rug gripper 110 to the bottom surface 12 of the area rug 14. In addition, the voids 116 disadvantageously trap unwanted moisture and debris against the floor surface 16 in which the area rug is meant to protect. This can cause damage which is not detectable until the area rug is removed.

Figure 3:
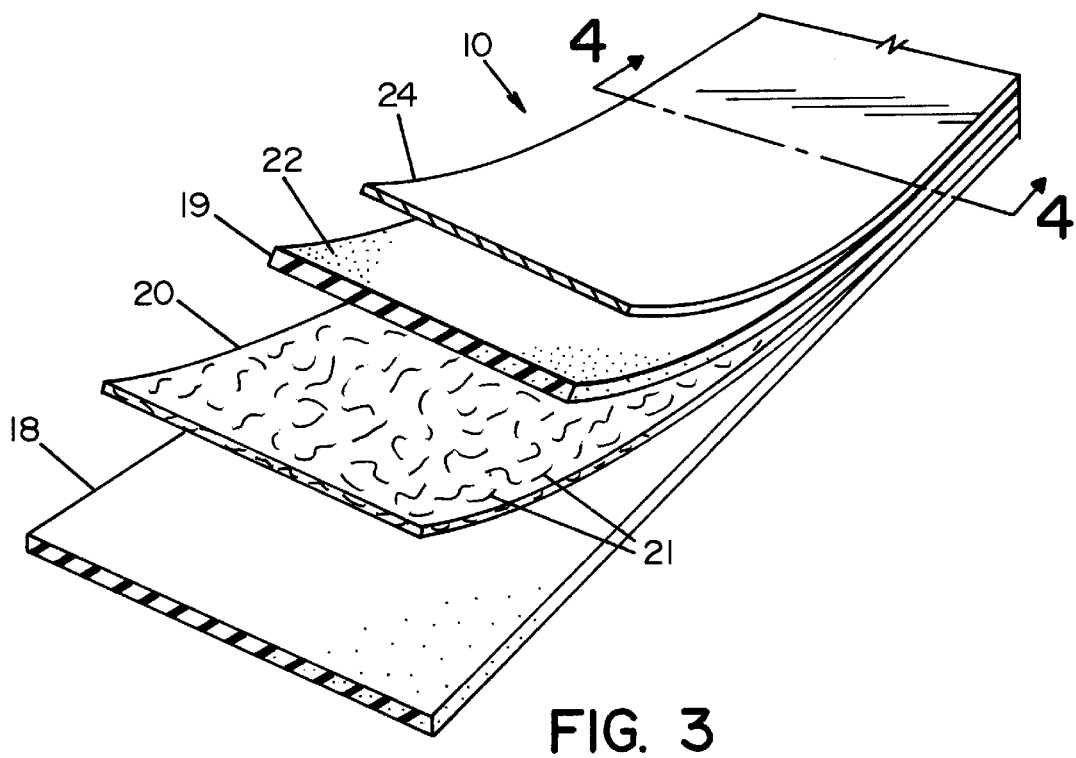
FIG. 3 is a top perspective view of the present invention showing: partial removal of the backer and partial separation of the layers thereof.
Figure 4:
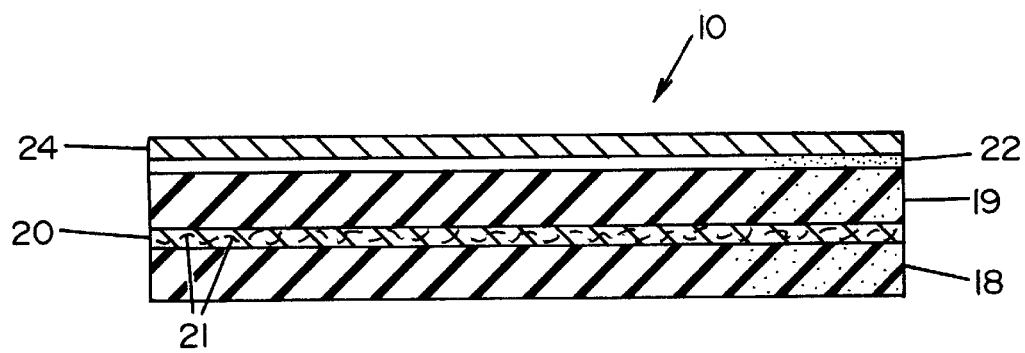
FIG. 4 is a sectional elevation view taken along line 4—4 in FIG. 3.

Referring to FIGS. 3 and 4, rug gripper 10 comprises a lower foam layer 18, an upper foam layer 19, a fabric sheet layer 20, and an adhesive top layer 22. The adhesive top layer 22 is protected by a backer 24.

The lower foam layer 18 and upper foam layer 19 are preferably a non-skid aqueous dispersion closed cell foam. More particularly, the foam material is a latex foam without plasticizers or oils which has good characteristics of resiliency, thereby reducing the residue left behind after removal from floor surface 16. Products in the past utilizing adhesives to adhere themselves to the floor surface 16 typically left behind adhesive residue on the floor surface 16 which increased over time. Even polyvinyl chloride coated foam scrims used in the past have contained plasticizers which can leech out over time, thereby causing discoloration of floor surface 16 upon which the PVC foam is placed. The lower foam layer 18 and upper foam layer 19 can vary in thickness; however, the total thickness of the rug gripper 10 is preferably approximately 0.04 inch. The density of the foam used in lower foam layer 18 and upper foam layer 19 is such that the weight of the rug gripper 10 is 3.5 oz/yd$^2$. It should be noted that a heavier foam can be utilized to create both foam layers 18 and 19.

The fabric sheet layer 20 is preferably comprised of a polyester non-woven fabric 21 and is a relatively thin and smooth layer. This layer is also substantially continuous, having no sizable pores or voids. The lower and upper foam layers 18 and 19 are produced by coating the foam material onto fabric sheet central layer 20. Commercial products using this technology of coating foam onto a fabric layer have been available for a number of years.

Adhesive top layer 22 is a thin layer of an adhesive that is used to adhere rug gripper 10 to the underside surface 12 of rug 14. Preferably, the adhesive is an acrylic, but other adhesives known in the art can be used. Because upper foam layer 19 is smooth and continuous, adhesive top layer 22 can be thinner than the adhesive used in prior art scrim products 110. Furthermore, by using a continuous product without voids, the amount of contact area that engages the underside surface 12 of rug 14 is substantially increased thereby producing better adhesion between rug gripper 10 and underside surface 12. Backer 24 covers adhesive layer 22 to protect the layer until the rug gripper 10 is adhered to the underside surface 12 of the area rug 14. Preferably, backer 24 is a silicon coated release paper.

Figure 5:
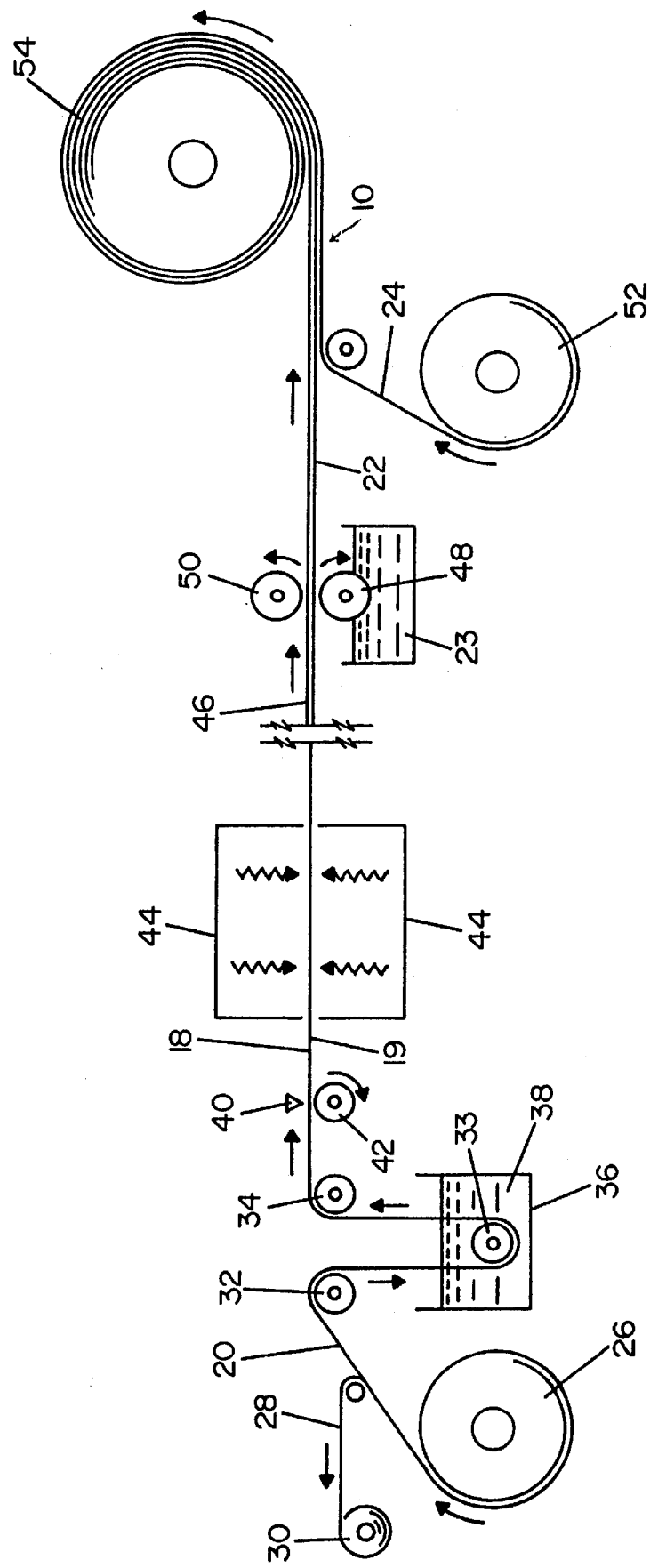
FIG. 5 is a schematic diagram of a method and apparatus for making the rug gripper seen in FIGS. 1, 3 and 4.

FIG. 5 illustrates the manufacturing process for the rug gripper 10. Fabric sheet layer 20 is provided on a first feed roll 26. If a protective layer 28 is provided on fabric sheet layer 20, it can be removed onto take-up roll 30. Fabric sheet central layer is then guided by guide rollers 32, 33 and 34 through aqueous dispersion bath 36 which deposits latex 38 onto both sides of the fabric sheet layer 20 thereby forming lower and upper foam layers 18 and 19 respectively. Thickness of foam layers 18 and 19 are controlled by the gap between a wiper blade 40 and a roller 42 as fabric sheet 20 and latex 38 are pulled past wiper blade and roller 40 and 42 respectively. The two layers are then pulled through a curing oven 44 wherein the heat of oven 44 causes the latex to release gases thereby producing foam and to cure forming lower and upper foam layers 18 and 19 respectively. In addition, foam layers 18 and 19 are bonded to central fabric layer 20 to produce partial laminate 46.

Preferably, by an independent process and machine, adhesive top layer 22 and backer 24 are then applied to partial laminate 46. More particularly, a liquid adhesive 23 is coated onto the upper foam layer 19 side of the partial laminate 46 by means of a transfer roll 48 and support roll 50 to create adhesive top layer 22. It should be noted that other conventional means known in the art could be used to apply adhesive top layer 22 and backer 24 to upper foam layer 19 of partial laminate 46. The thickness of adhesive top layer 22 can be controlled by the viscosity of liquid adhesive 23 applied to transfer roll 48, or any other known means. Once the adhesive top layer 22 has been applied, backer 24 is provided by second feed roll 52, and the finished rug gripper 10 is taken up on a take-up roll 54.

The resulting rug gripper 10 has a substantially uniform density and thickness over its entire width and length. Accordingly, considerably more control can be achieved over the finished product, virtually eliminating voids that are present in the prior art scrim material. In addition, the contact surface of the adhesive top layer 22 is greatly increased, thereby producing better adhesion between the rug gripper 10 and underside surface 12 of rug 14. Moreover, latex based foam material, rather than the polyvinyl chloride based material used in some of the prior art, is less damaging to floor surface 16 which the area rug is meant to protect. Furthermore, the continuous latex based foam provides a cohesive attractive force that holds rug gripper 10 in place on the floor surface 16 without the use of adhesives. The material acts as if it is lightly adhesively bound to the floor, even though no adhesive is used. This further protects the floor surface 16 and increases the ease of use of the product by being repositionable and by eliminating unwanted residue when the area rug 14 is removed or replaced. Accordingly, the advantages of an adhesive to hold the area rug in place are present without the disadvantages associated with an adhesive in contact with the floor surface 16.

While considerable emphasis has been placed herein on the specific structure of the preferred embodiment of the invention, it will be appreciated that other embodiments can be made and that many changes can be made in the preferred embodiment without departing from the principles of the invention. Accordingly, it is to be distinctly understood that the foregoing descriptive matter is to be interpreted merely as illustrative of the present invention, and not as a limitation thereof.

Having thus described the invention, it is claimed:

1. A repositionable rug gripper for preventing lateral movement of a rug relative to a floor surface, said rug gripper comprising:
    a continuous foam layer comprising a continuous lower foam layer having a non-slip nonadhesive bottom surface for directly engaging the floor surface and a continuous upper foam layer having a top surface for engaging an underside of the rug;
    a continuous thin fabric layer intermediate said lower foam layer and said upper foam layer; and,
    an adhesive layer on said upper foam layer top surface, said adhesive is an acrylic adhesive.

2. A repositionable rug gripper for preventing lateral movement of a rug relative to a floor surface, said rug gripper comprising:
    a continuous foam layer comprising a continuous lower foam layer having a non-slip nonadhesive bottom surface for directly engaging the floor surface and a continuous upper foam layer having a top surface for engaging an underside of the rug;
    a continuous thin fabric layer intermediate said lower foam layer and said upper foam layer; and,
    an adhesive layer on said upper foam layer top surface, said adhesive is a pressure to aid sensitive adhesive.

3. A repositionable rug gripper for preventing lateral movement of a rug relative to a floor surface, said rug gripper comprising:
    a continuous foam layer comprising a continuous lower foam layer having a non-slip nonadhesive bottom surface for directly engaging the floor surface and a continuous upper foam layer having a top surface for engaging an underside of the rug;
    a continuous thin fabric layer intermediate said lower foam layer and said upper foam layer;
    an adhesive layer on said upper foam layer top surface; and,
    a backer layer of silicone coated release paper in contact with said adhesive layer.

\* \* \* \* \*

UNITED STATES PATENT AND TRADEMARK OFFICE
CERTIFICATE OF CORRECTION

PATENT NO. : 6,558,786 B1
DATED : May 6, 2003
INVENTOR(S) : Michael S. Jupina

It is certified that error appears in the above-identified patent and that said Letters Patent is hereby corrected as shown below:

Column 6,
Line 25, after "pressure", delete "to aid".

Signed and Sealed this

Twenty-fifth Day of October, 2005

JON W. DUDAS
*Director of the United States Patent and Trademark Office*